United States Patent
Chu et al.

(10) Patent No.: US 11,249,646 B1
(45) Date of Patent: Feb. 15, 2022

(54) LARGE SEGMENT MANAGEMENT

(71) Applicant: OmniTier Storage, Inc., Santa Clara, CA (US)

(72) Inventors: Derrick Preston Chu, Santa Clara, CA (US); Suneel Indupuru, Cupertino, CA (US); Daryl Ng, San Jose, CA (US)

(73) Assignee: OmniTier Storage, Inc., Milpitas, CA (US)

( * ) Notice: Subject to any disclaimer, the term of this patent is extended or adjusted under 35 U.S.C. 154(b) by 322 days.

(21) Appl. No.: 15/420,804

(22) Filed: Jan. 31, 2017

Related U.S. Application Data

(60) Provisional application No. 62/289,592, filed on Feb. 1, 2016.

(51) Int. Cl.
*G06F 3/06* (2006.01)

(52) U.S. Cl.
CPC ............ *G06F 3/061* (2013.01); *G06F 3/0604* (2013.01); *G06F 3/0659* (2013.01); *G06F 3/0685* (2013.01)

(58) Field of Classification Search
CPC .... G06F 3/0604; G06F 3/0659; G06F 3/0685; G06F 3/061; G06F 2212/1016
See application file for complete search history.

(56) References Cited

U.S. PATENT DOCUMENTS

| | | | | |
|---|---|---|---|---|
| 6,412,043 B1* | 6/2002 | Chopra | ............... | G06F 9/30032 711/118 |
| 9,507,523 B1* | 11/2016 | Mullendore | ........ | G06F 12/0246 |
| 9,720,596 B1* | 8/2017 | Bono | .................... | G06F 3/0608 |
| 2005/0144396 A1* | 6/2005 | Eschmann | .......... | G06F 12/0804 711/143 |
| 2006/0156305 A1* | 7/2006 | Delapedraja | ............ | G06F 9/526 718/102 |
| 2008/0320214 A1* | 12/2008 | Ma | ........................ | G06F 3/0613 711/103 |
| 2010/0185804 A1* | 7/2010 | Omizo | ................ | G06F 12/0246 711/103 |
| 2010/0232048 A1* | 9/2010 | Aida | ........................ | G11B 5/09 360/48 |
| 2016/0054922 A1* | 2/2016 | Awasthi | ................ | G06F 3/0631 711/103 |

(Continued)

OTHER PUBLICATIONS

Article "cache memory definition";the article taken from a Dec. 27, 2015 snapshot from archive.org is attached. available online at https://searchstorage.techtarget.com/definition/cache-memory (Year: 2015).*

(Continued)

*Primary Examiner* — William E. Baughman
*Assistant Examiner* — Janice M. Girouard
(74) *Attorney, Agent, or Firm* — Van Pelt, Yi & James LLP

(57) ABSTRACT

A plurality of pieces of write data are aggregated on a buffer to obtain a segment where the segment exceeds a smallest write size supported by storage. An address on the storage is determined for the segment. Location information and identifier(s) associated with the segment are recorded where the location information points to the storage, as opposed to the buffer, while the write data is being aggregated. When the write data has been aggregated into the segment, the segment is written to the storage wherein the location information remains unchanged in response to the writing to the storage.

11 Claims, 13 Drawing Sheets

(56) References Cited

U.S. PATENT DOCUMENTS

2017/0017570 A1\* 1/2017 Yeh .................... G06F 12/0246
2017/0090817 A1\* 3/2017 Cho ......................... G06F 7/24

OTHER PUBLICATIONS

"Is Parallel Programming Hard, And, If So, What Can You Do About It?", edited by Paul E. McKenney, Jan. 31, 2015.file:///C:/Users/jgirouard/Desktop/technology/Memory/perfbook.2015.01.31a%20Paul%20McKinney.pdf. (Year: 2015).\*
"Is Parallel Programming Hard, And, If So, What Can You Do About It?", edited by Paul E. McKenney, Jan. 31, 2015, attached in the Non-Final Office Action. It is available online at https://mirrors.edge.kernel.org/pub/linux/kernel/people/paulmck/perfbook/perfbook.2015.01.31a.pdf (Year: 2015).\*
A screen shot of the merrian-webster dictionary for the term "correspond" taken by archive.org Dec. 8, 2013. (Year: 2013).\*

\* cited by examiner

LARGE SEGMENT MANAGEMENT

CROSS REFERENCE TO OTHER APPLICATIONS

This application claims priority to U.S. Provisional Patent Application No. 62/289,592 entitled LARGE SEGMENT SSD MANAGEMENT filed Feb. 1, 2016 which is incorporated herein by reference for all purposes.

BACKGROUND OF THE INVENTION

Performance when accessing storage varies depending upon the access pattern. Generally speaking, sequential access patterns tend to result in better performance than random access patterns. For example, if the storage is a hard disk drive (HDD), then the HDD system does not need to move its head as much to read the next location with a sequential access pattern. With DRAM, the DRAM row is already pre-charged. With a solid state drive (SSD), a larger address range can be pre-fetched or coalesced. New access techniques which work with existing storage (e.g., without requiring the storage to support new features or capabilities) and which approximate sequential-like performance would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
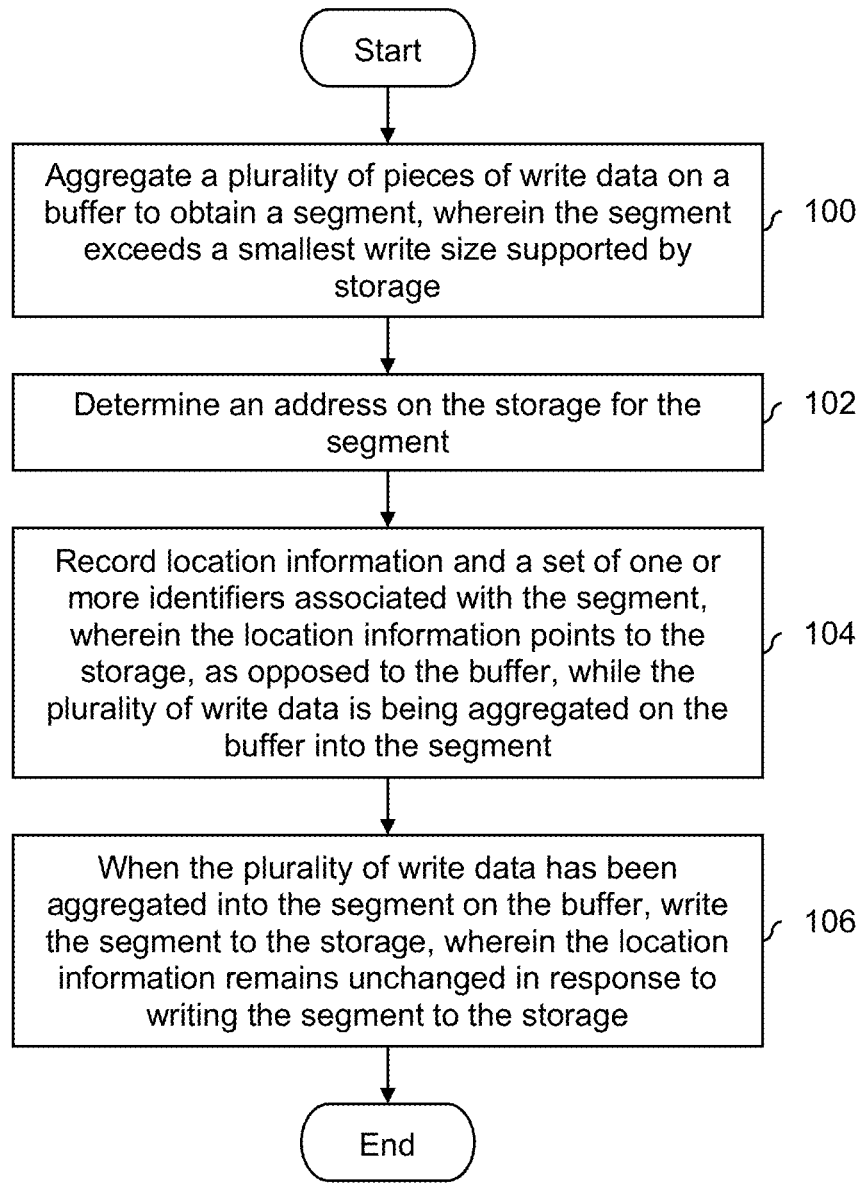
FIG. 1 is a flowchart illustrating an embodiment of a process to write large segments of data to storage.

FIG. 1 is a flowchart illustrating an embodiment of a process to write large segments of data to storage. In various embodiments, the storage being written to is a solid state drive (SSD), a hard disk drive (HDD) including shingled magnetic recording hard disk drive (SMR HDD), DRAM, etc.

At 100 a plurality of pieces of write data are aggregated on a buffer to obtain a segment, wherein the segment exceeds a smallest write size supported by storage. In one example, the write data is received from a caching application which caches data on behalf of other, higher-level applications. The write data (in this example at least) is associated with key-value pairs and a single piece of write data is on the order of tens of bytes. In some embodiments, a segment is on the order of hundreds of megabytes or even gigabytes, which is larger than a smallest write size supported by the storage. For these exemplary numbers, on the order of tens or hundreds of thousands of pieces of write data may be aggregated into a segment.

At 102, an address on the storage is determined for the segment. For example, the storage may be (e.g., conceptually) divided up into segments. If one segment is 1 GB, then the address determined for the segment at step 102 may be 0 GB, 1 GB, 2 GB, etc. To put it another way, step 102 decides where the segment will be stored on the storage. It is noted that the size of a segment and/or the location of any segment boundaries is not necessarily known to and/or dictated by the storage. Rather, the component or entity which is writing to the storage decides what the size of a segment will be, where any segment boundaries are, and ensures that only segments are written to the storage.

In some embodiments, the address determined at step 102 is a logical address (e.g., as opposed to a physical address which corresponds to the actual and/or physical location on storage). One benefit to this is that it does not attempt to take over responsibility for the Flash Translation Layer (FTL) (more generally, logical-to-physical mapping) from the storage (normally the storage manages the FTL or logical-to-physical mapping). For example, some other techniques may explicitly or directly specify where data is to be physically and/or actually stored. Keeping FTL management (or other logical-to-physical mapping) in the storage is desirable because existing storage do not need to be modified. Existing storage expects read addresses and write addresses to be logical addresses and if read addresses and write addresses were instead physical addresses, the storage would have be redesigned or otherwise modified.

At 104, location information and a set of one or more identifiers associated with the segment are recorded, wherein the location information points to the storage, as opposed to the buffer, while the plurality of write data is being aggregated on the buffer into the segment. For example, if some data needs to be retrieved or otherwise read back, the location information may be used to determine the location of the desired data. Even if the desired data is located in the buffer as opposed to the storage (e.g., because a segment's worth of write data has not yet been received), the location information will point to the storage as opposed to the buffer. As will be described in more detail below, recording address in this manner eliminates the need to update the location information when the segment is written from the buffer to storage.

In some embodiments, the location information recorded at step 104 comprises the location of the beginning or start of the segment and respective offsets for each of the pieces of data which make up the segment. To obtain the (e.g., precise) location on storage for a given piece of data, the appropriate offset is added to the segment location. Alternatively, in some embodiments the location information recorded at step 104 includes the (e.g., precise) location on storage for each piece of data in the segment. To put it another way, an offset does not need to be added to the start or beginning of a segment in order to obtain the (e.g., precise) location of one of the pieces of data in the segment.

In various embodiments, the location information and identifiers are recorded in a variety of locations at step 104. In some embodiments, a buffer address (e.g., associated with the buffer) is used to record what pieces of write data and/or segment is/are currently residing in the buffer. Once the segment is completed and written to storage, the buffer address is cleared. In some embodiments, a table is used to store location information and identifiers on a more permanent or long term basis. The location information and identifiers are stored on such a table (e.g., at a minimum) once the corresponding pieces of write data and/or segment is/are written to the storage. If desired, the location information and/or identifiers may be recorded in the table before that (e.g., while the segment is still being assembled in the buffer since the location information and/or identifiers are destined for the table).

At 106, when the plurality of write data has been aggregated into the segment on the buffer, the segment is written to the storage, wherein the location information remains unchanged in response to writing the segment to the storage. Since the location information recorded already points to the storage, it does not need to be updated when the segment is written from the buffer to the storage.

The writes at step 106 makes use of whatever write interface or write size is support by the storage. To put it another way, the process of FIG. 1 works with existing storage interfaces and does not require the storage to be changed to support new write features or options. For example, suppose that each segment is 1 GB. Some SSD storage do not support a single write of 1 GB. If so, the segment may be broken up into the largest chunk supported in order to write the entire segment to storage. This may also be done to not overburden the device with writes so no other operation will be performed.

The following figure shows an example of a table, a buffer, a buffer address, and a storage to illustrate the process of FIG. 1.

Figure 2:
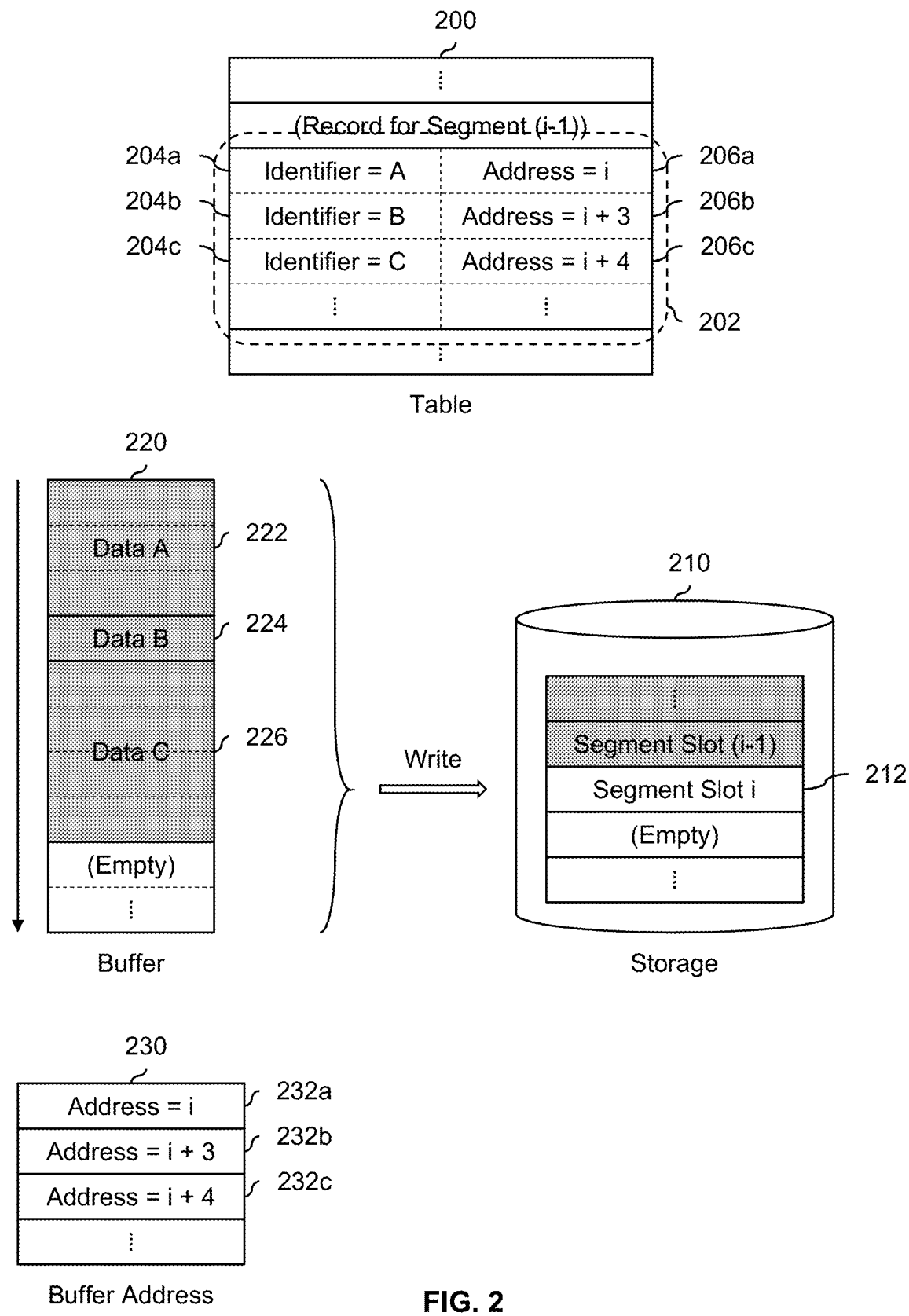
FIG. 2 is a diagram illustrating an embodiment of a table, a buffer, a buffer address, and a storage.

FIG. 2 is a diagram illustrating an embodiment of a table, a buffer, a buffer address, and a storage. In the example shown, a segment is being assembled in buffer 220. In the state shown, the segment currently includes data A (222), data B (224), and data C (226). The segment, once assembled, will be written to segment slot i (212) on the storage (210). This is merely one example and other embodiments are implemented differently.

As each piece of data is received and added to the segment in the buffer (220), a corresponding identifier and corresponding location information (e.g., on storage 210) is added to the table (200). Note, for example, that table 200 includes identifiers (see, e.g., 204a-204c) and location information (see, e.g., 206a-206c) for data A-C. The table (200) is used to store location information and identifiers on a long term basis. In this example, the identifier and location information for each piece of write data is added to the table as each piece of write data is received. This may be desirable because then many small writes are spread out over time.

The buffer address (230) only stores location information (e.g., there are no identifiers stored therein). Also, the buffer address only stores location information while a corresponding segment is in the buffer (e.g., because that buffer is still in the process of being assembled). As each piece of write data is received and aggregated into the segment, its corresponding location information (e.g., on storage 210) is added to the buffer address (230). Note, for example, that buffer address (230) includes location information 206a-206c.

In this example, the location information (e.g., 206a-206c and 232a-232c) is at the write data level (e.g., a plurality of locations are recorded for the plurality of pieces of write data) as opposed to the segment level (e.g., where a single address would be recorded for the segment). In some embodiments, the location information is at the segment level (e.g., the buffer address only records the segment slot where the segment being assembled is destined for). Also, the location of each piece of data is recorded precisely or exactly in this example. In some other embodiments, location information includes the start of the segment and a corresponding offset where a given piece of data is located. In order to obtain the exact or precise location where a given piece of data is located, the offset and start of the segment are added together. In other words, location information may be recorded in a variety of ways and this example is not intended to be limiting.

When the segment is completed (not shown), the write data which comprises the segment is written to segment i (212) in storage (210). Since the location information (206a-206c) recorded in record 202 points to the storage (210) as opposed to the buffer (220), the location information does not need to be updated.

Writing the segment to the storage (210) also causes the location information (232a-232c) to be cleared from the buffer address (230), not shown. As the next buffer is assembled in the buffer (220), the buffer address (230) is populated with location information for the next buffer.

Consider what would happen if the location information (e.g., 206a-206c) instead pointed to the buffer during assembly of the segment. Once the segment is written to storage, the location information would need to be updated to point to the storage instead of the buffer. If the segment is on the order of gigabytes and each piece of write data is on the order of tens of bytes, then on the order of tens of millions of addresses would need to be updated to point from the buffer to storage. This is would incur a large and disruptive performance hit. By having location information (e.g., in the table) always point to the storage even while the segment is being assembled in the buffer, this performance hit is avoided.

The following figure shows an example of a segment and discusses why enforcing a constraint that only segments (which tend to be quite large) are written to storage improves the performance of the system.

Figure 3:
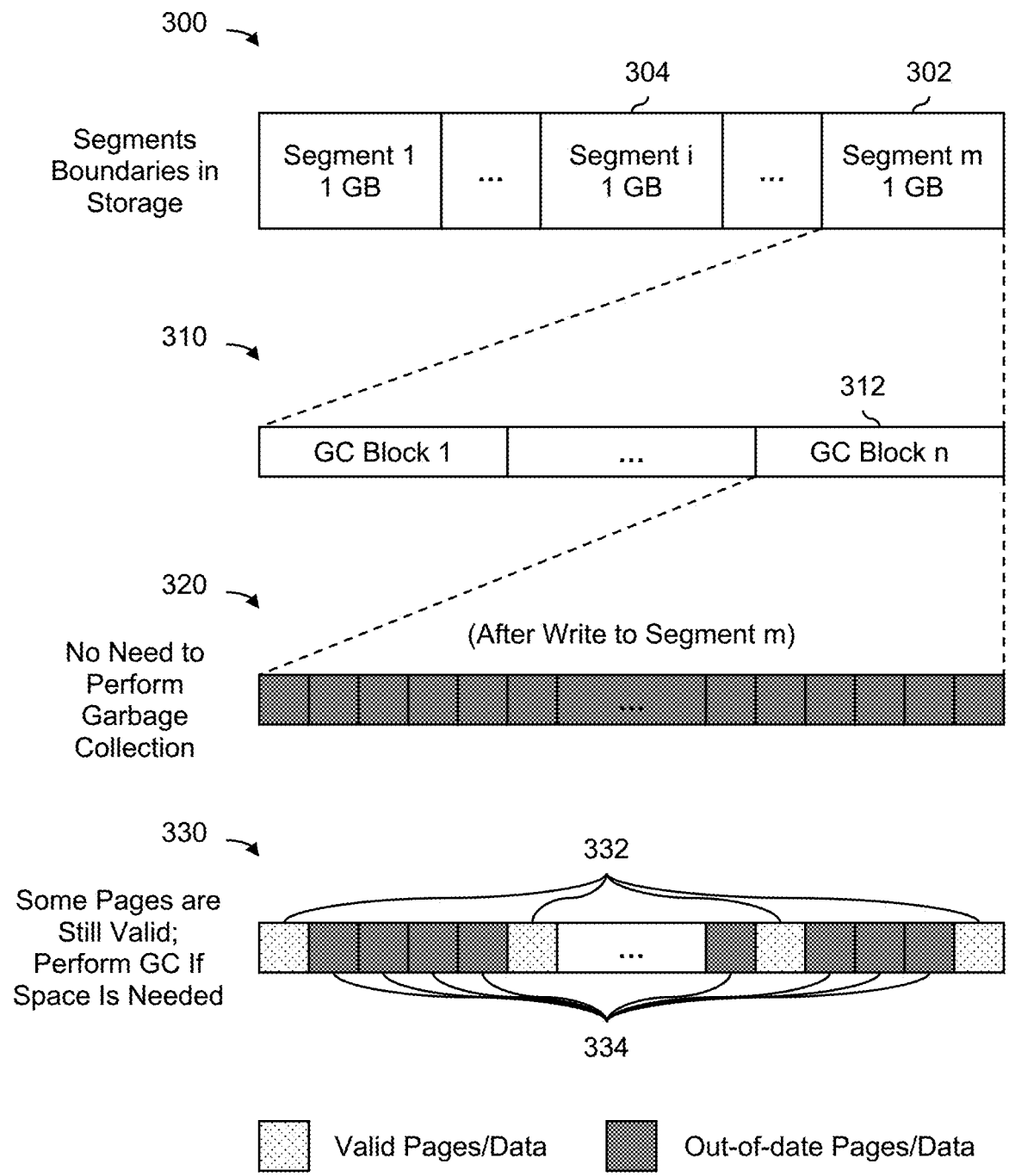
FIG. 3 is a diagram illustrating an embodiment of garbage collection blocks and pages which are affected by a write to a segment.

FIG. 3 is a diagram illustrating an embodiment of garbage collection blocks and pages which are affected by a write to a segment. In the example shown, the storage is SSD storage. Diagram 300 shows the segments boundaries in the exemplary SSD storage. In this particular example, each segment has a size of 1 GB and there are m segments in the SSD storage. The component or entity writing to the SSD storage follows the segment boundaries shown and writes only in units of segments (e.g., even though smaller writes are supported by the storage).

Diagram 310 shows the garbage collection blocks in segment m (302). In this example, there are n garbage collection blocks per segment. Since entire segments are written (e.g., per the process of FIG. 1), all of the n garbage collection blocks in diagram 310 are become out of date when segment m (302) is written (in this example, the n garbage collection blocks already have some data stored thereon, and writing to them causes that stored data to become obsolete or out of date).

Diagram 320 shows the pages in garbage collection block n (312) after segment m (302) is written. As described above, in this example, data was already stored in the pages shown in diagram 320 and writing to segment m (320) causes all of the pages shown to become invalid or otherwise obsolete.

One of the benefits to performing writes in the manner described in FIG. 1 is that the number of garbage collection blocks which require (e.g., meaningful) garbage collection is reduced, which in turn improves the performance of the system. A garbage collection block which contains no valid data (see, e.g., diagram 320) will not require substantial garbage collection processing. Rather, it will simply be erased and marked as an open block, without the SSD having to copy any valid data elsewhere and update a corresponding logical-to-physical address mapping (i.e., location information) accordingly. When the SSD performs garbage collection, it cannot service requests on the front end (e.g., from an application). As such, eliminating at least some garbage collection cycles or operations enables the SSD to respond more promptly to a read or write request on the front end. This may be desirable if an application has some read or write request which it wants serviced quickly. Garbage collection is a background process initiated by the SSD and it would not be desirable (as an example) if the SSD decides to perform garbage collection when the application has issued read or write requests which it wants performed quickly.

If smaller writes (e.g., smaller than a segment, which in this example is 1 GB) are permitted to be performed on the storage (e.g., which is not permitted by the process of FIG. 1), then the state shown in diagram 330 is likely to result and garbage collection will be performed more frequently and/or the processing required is not trivial. This is because smaller writes are likely to invalidate some (but not all) pages in a garbage collection block. Note, for example, that in diagram 330, some of the data is valid (332) and some of the data is invalid (334) where the invalid data results from a small write. If garbage collection is performed on the block shown in diagram 330, the valid pages (332) would be copied to another block before the block was erased. The location information (e.g., in the form of a logical-to-physical address mapping) would also be updated. This more substantial processing would delay a front-end access request, which is undesirable. The block shown in diagram 320, in contrast, is not eligible for garbage collection (or, at the very least, would be trivial or minimal) and therefore is more desirable.

Currently, many SSD systems perform garbage collection at the block level. That is, garbage collection can be performed on a single block. Naturally, this is implementation specific and could change. As described above, to reflect this, the term "garbage collection block" refers to the level or smallest unit at which garbage collection is performed. For example, if some SSD were to perform garbage collection on groups of 4 blocks (i.e., garbage collection is never performed on a single block, or on just two or three blocks), then a garbage collection block for that system would comprise 4 blocks. In some embodiments, a (garbage collection) block is on the order of 4 MB.

Writing segments (e.g., which are large) to storage also provides performance benefits even when the storage is not SSD storage. For example, shingled magnetic recording hard disk drive (SMR HDD) is one type of HDD storage where the tracks are overlapped (at least partially) to increase storage density. However, the overlapping nature of the tracks means that data cannot be arbitrarily updated in-place without destroying data on adjacent tracks. Writing (e.g., large) segments would also help with the performance of SMR HDD for similar reasons.

In some embodiments, the successive segments are written to the storage at non-sequential addresses. The following figure describes one such example.

Figure 4:
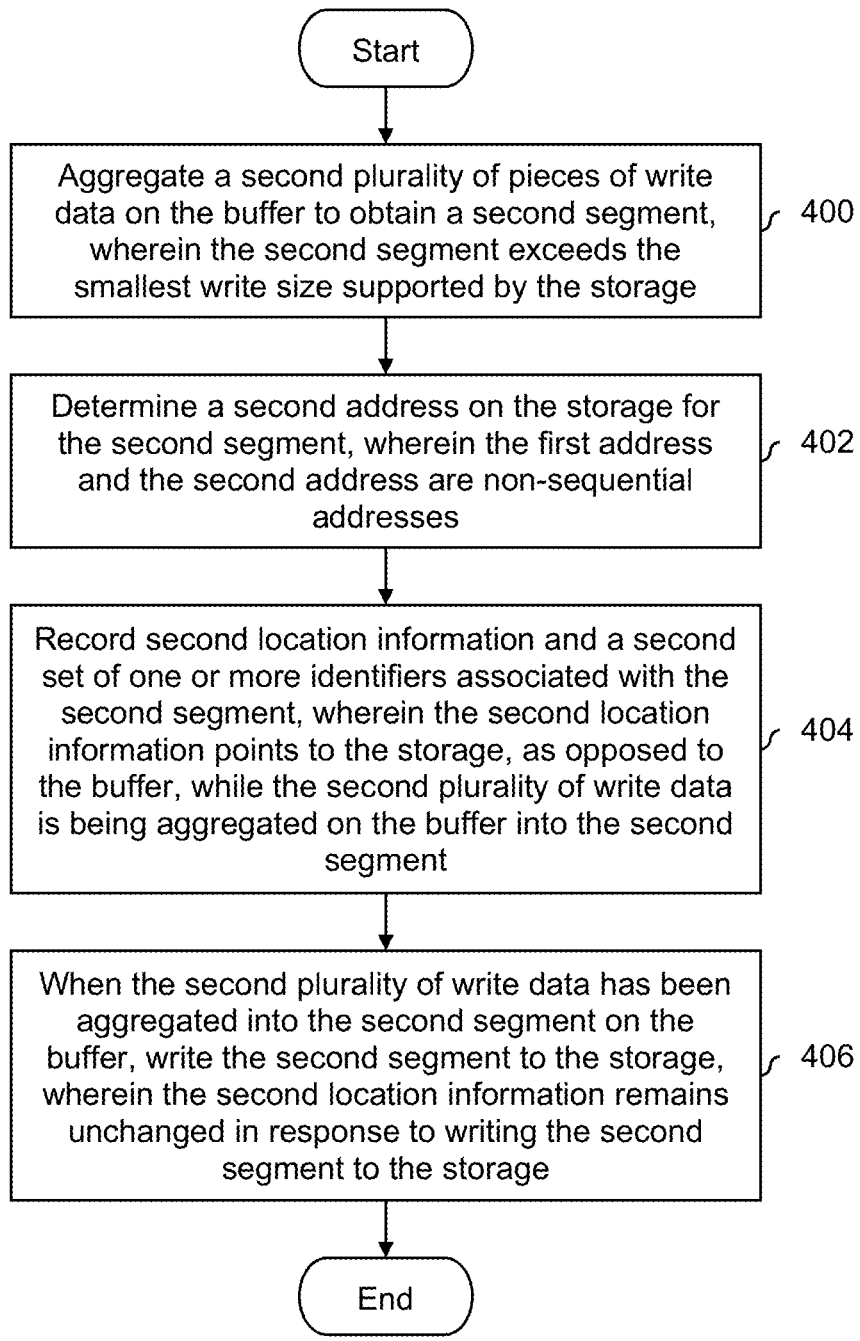
FIG. 4 is a flowchart illustrating an embodiment of a process to write a second segment to storage.

FIG. 4 is a flowchart illustrating an embodiment of a process to write a second segment to storage. In this example, the process of FIG. 4 is performed in combination with the process of FIG. 1.

At 400, a second plurality of pieces of write data is aggregated on the buffer to obtain a second segment, wherein the second segment exceeds the smallest write size supported by the storage. For example, the same buffer may be used to aggregate a (first) segment (e.g., at step 100 in FIG. 1) at a first point in time and a second segment (e.g., at step 400 in FIG. 4) at a second point in time.

At 402, a second address on the storage is determined for the second segment, wherein the first address and the second address are non-sequential addresses. The first address refers to the address that is determined at step 102 in FIG. 1 (e.g., for a first segment).

At 404, second location information and a second set of one or more identifiers associated with the second segment are recorded, wherein the second location information points to the storage, as opposed to the buffer, while the second plurality of write data is being aggregated on the buffer into the second segment. For example, when the first segment is being assembled, location information associated with the first buffer is stored in a buffer address (e.g., at step 104 in FIG. 1). When the second segment is being assembled, the buffer address stores location information for the second buffer (e.g., at step 404 in FIG. 4). In some embodiments, a table stores all of the location information and identifiers (e.g., for both segments) on a long term basis.

At 406, when the second plurality of write data has been aggregated into the second segment on the buffer, the second segment is written to the storage, wherein the second location information remains unchanged in response to writing the second segment to the storage. Using FIG. 3 as an example, segment i (304) is written first. The next write after that is to segment m (302). Note that there is no intervening write between the two writes (e.g., time-wise) and the addresses (e.g., i and m) are not sequential (e.g., there is at least one segment between the two (e.g., location-wise) as indicated by the ellipsis between those addresses).

In some embodiments, the process waits for the write of the first segment (e.g., at step 106 in FIG. 1) to be completed before starting the write of the second segment at step 106. In some cases, this helps to ensure that the first segment and the second segment are not combined or mixed together in the backend and/or stored together on the storage.

One design question to address is what size to make a segment. The following figures discusses some example for how the size of a segment may be selected.

Figure 5:
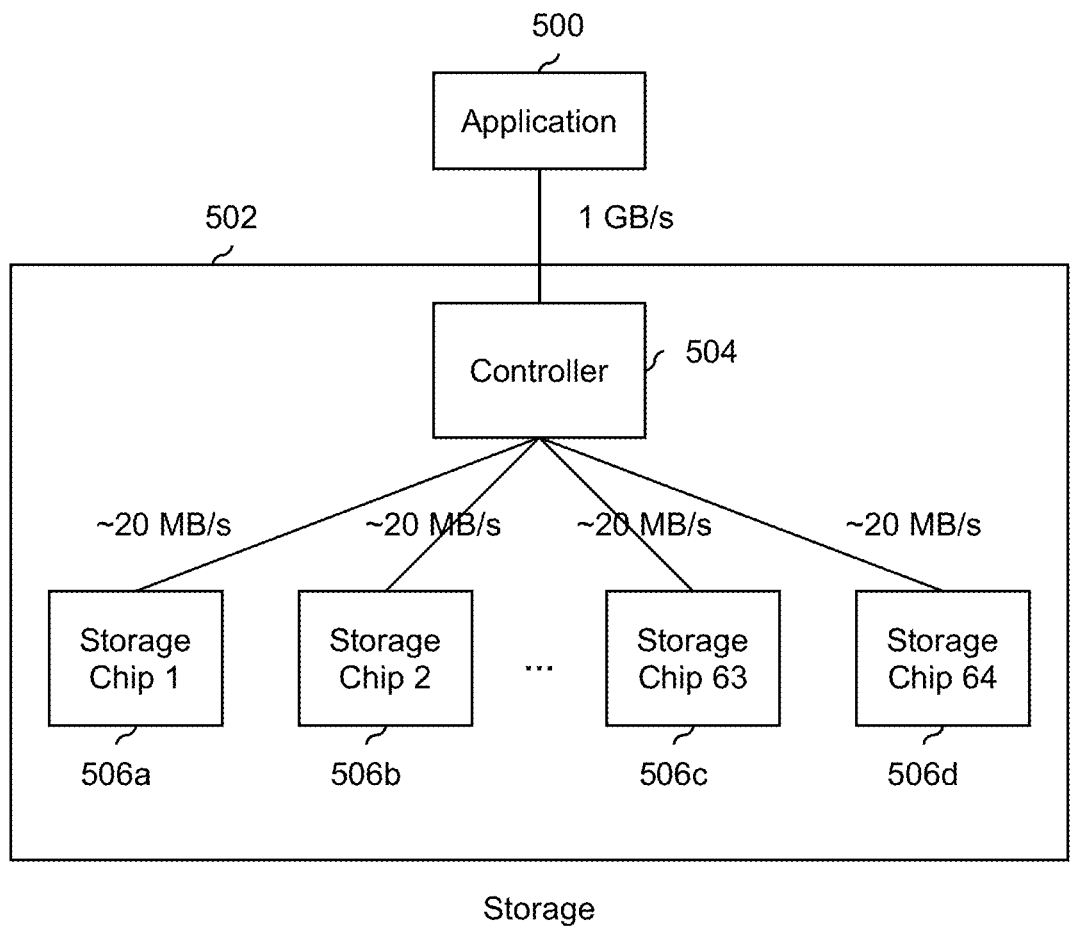
FIG. 5 is a diagram illustrating an embodiment of a storage device with multiple chips.

FIG. 5 is a diagram illustrating an embodiment of a storage device with multiple chips. In this example, storage 502 includes 64 storage chips (506a-506d), sometimes referred to as semiconductor devices. The storage chips include the storage media, such as SSD media if the storage is SSD. Storage 502 supports or otherwise guarantees 1 GB/s of write performance to application 500 (where application 500 writes in segments per the process of FIG. 1). Each of storage chips 506a-506d is capable of supporting ~20 MB/s of write performance. In order to present 1 GB/s of write performance to application 500, controller 504 writes the 64 storage chips (506a-506d) in parallel. This is sometimes referred to as "striping."

Striping affects the optimal size of a segment (e.g., as measured by the number or percentage of garbage collection blocks which are completed invalidated by a write to a segment, thus eliminating the need to perform garbage collection on those garbage collection blocks). For example, suppose that 1 page=16 kB, 1 garbage collection block=1 block, and 1 block=256 pages. This puts the size of one garbage collection block at ~4 MB.

Suppose that the size of a segment is set to the size of a garbage collection block (in this case ~4 MB) and that a single segment is written. As a result of striping, the write is divided up amongst the 64 storage chips: ~64 kB is written to the first storage chip (506a), ~64 kB is written to the second storage chip (506b), and so on. Since the size of a garbage collection block is ~4 MB, the write to the segment will cause each of the storage chips to have a partially-invalidated garbage collection block, which are candidates for garbage collection. This is not desirable if the objective is to reduce the number of garbage collection block which need to be garbage collected.

To account for striping, in one example, the size of a segment is set to ~256 MB (or larger). That way, even after striping (e.g., when 1/64 of the segment is written to a particular storage chip), a garbage collection block is completely written so that the entire garbage collection block is invalidated or otherwise made out-of-date. For example, the first storage chip (506a) would have ~4 MB written to it, the second storage chip (506b) would have ~4 MB written to it, and so on. Since 4 MB is the size of a garbage collection block, the entire garbage collection block is invalided, thus eliminating the need to perform garbage collection.

In some embodiments, the size of a segment is determined by simulating the system (e.g., simulating reading from and writing to the storage) with different segment sizes and obtaining a performance curve as a function of segment size. The following figure shows an example of this.

Figure 6:
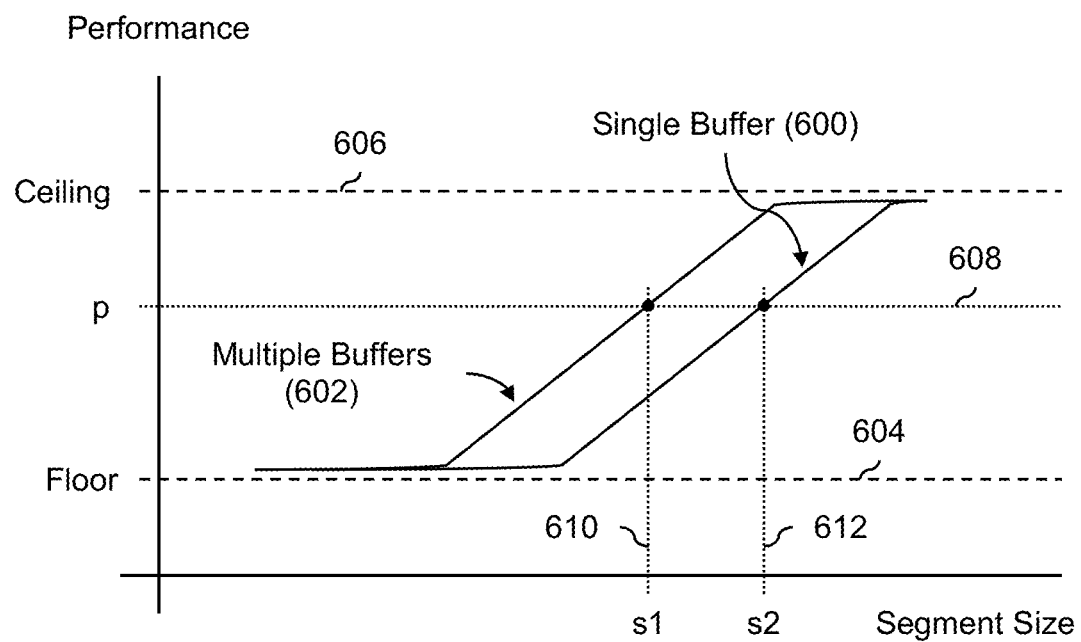
FIG. 6 is a diagram illustrating an embodiment of performance curves as a function of segment size.

FIG. 6 is a diagram illustrating an embodiment of performance curves as a function of segment size. In the example shown, the x-axis of the graph corresponds to the size of a segment and the y-axis corresponds to some performance metric (e.g., access time, access bandwidth, etc.). In this example, the single buffer performance curve (600) corresponds to the process of FIG. 4 where non-sequential addresses are written back-to-back.

Generally speaking, both performance curves are obtained by simulating or modeling the access or traffic patterns that are anticipated for the particular application or environment. For example, this may include simulating when read and/or write requests occur, and the addresses which are accessed by those read requests and write requests. Both performance curves write to the storage in segments and the simulation is repeated with different segment sizes in order to obtain data points. The data points are then interpolated (not shown) to obtain the performance curves shown.

The single buffer curve 600 is associated with an implementation where there is only a single buffer to assemble segments. Once there is a complete segment, the segment is written to storage and the next segment is assemble. There is no particular restriction on the pattern of writes (e.g., the writes are not required to be in sequential order).

The multiple buffer curve is associated with a configuration where there are two or more buffers that are simultaneously used to assemble segments. Once one of the buffers is full, that segment is written to storage. In one example, a first buffer assembles segments which are written into a first ring buffer in storage, a second buffer assembles segments which are written into a second (non-overlapping) ring buffer in storage, and so on. If desired, write data can be sorted or categorized into an appropriate buffer so that incoming write data is stored with similar write data (e.g., hot data with hot data and cold data with cold data).

Generally speaking, the performance curves start out at or near a performance floor (504). The performance curves then both increase until they approach a performance ceiling (506) and then level off. The shapes of the performance curves are merely exemplary and are not intended to be limiting.

Once an appropriate performance curve is obtained, a segment size with an acceptable level of performance may be selected. For example, if a minimum performance level of p (608) is desired, then a minimum segment size of s2 (612) would be selected for the single buffer configuration (600) or a minimum segment size of s1 (610) would be selected for the multiple buffers configuration (602). Other design considerations such as cost and size may be taken into consideration as well.

As shown, the performance curve of the multiple buffer configuration (602) begins improving sooner than the single buffer performance curve (600). This means that for the same performance level of p (508), the former only needs to have a segment size of s1 (510) whereas the latter has to have a larger segment size of s2 (512). As the segment size increases, so too must the size of the buffer grow in order to build a segment of that size. Since larger buffers (i.e., more storage) cost more money, it is desirable for cost reasons (and possibly other reasons) to have a smaller sized segments. Therefore, in some applications it is desirable to use a multiple buffer configuration so that a same level of performance is achieved using smaller buffers. The following figure describes an example of a multiple buffer configuration.

Figure 7:
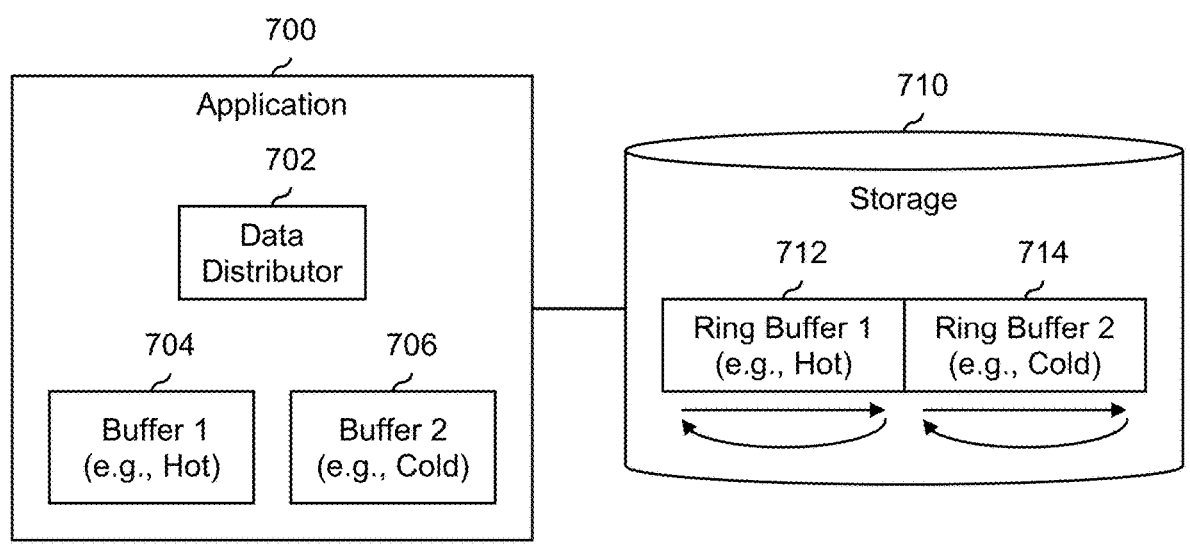
FIG. 7 is a diagram illustrating an embodiment of a multiple buffer configuration where multiple buffers independently assemble segments which are destined for different ring buffers in storage.

FIG. 7 is a diagram illustrating an embodiment of a multiple buffer configuration where multiple buffers independently assemble segments which are destined for different ring buffers in storage. In the example shown, application 700 includes a data distributor (702) and two buffers (704 and 706). Each of the buffers assembles a segment independently of the other buffer. In various embodiments, the buffers may either be the same size or different sizes (e.g., so that the segments which are assembled and written to the storage (710) may be the same size or different sizes). Although this example shows two buffers and ring buffers, any number of buffers and ring buffers may be used.

Write data is received at the application and the data distributor (702) assigns each piece of data to either the first buffer (704) or the second buffer (706). For example, the data distributor may decide if a given piece of write data is hot or cold. If the write data is determined to be hot by the data distributor, the write data is assigned to the first buffer (704). If the write data is determined to be cold by the data distributor, the write data is assigned to the second buffer (706). In one example, the application (700) is a caching application and there is an associated time-to-live value for each piece of write data. The time-to-live value may be compared against a time-to-live threshold and if the threshold is exceeded then the write data is classified as cold data.

Once one of the buffers assembles a complete segment, the segment is written to storage 710. In this example, the storage (710) is divided up into two parts: a first ring buffer (712) and a second ring buffer (714). In various embodiments, the sizes of the ring buffers may be the same or different. For example, due to more cold data than hot data (in this example at least), the second ring buffer is larger than the first ring buffer. Segments from the first buffer (704) are written to the first ring buffer (712) in the storage (710) and segments from the second buffer (706) are written to the second ring buffer (714) in the storage (710). The ring buffers are written from one end of the ring buffer to the other end without skipping any locations or addresses. Once the end of a ring buffer is reached, writing starts over again at the beginning of the ring buffer. To put it another way, the ring buffers are written in sequential order.

In addition to providing similar performance with using smaller buffers, a multiple buffer configuration (such as the one shown here) may be attractive in applications where the storage is SSD storage. Over time, programs and erases are damaging to the SSD, and so unnecessary programing or erasing of SSD storage is undesirable. Also, it is (generally speaking) desirable to keep hot data with hot data and cold data with cold data in SSD storage. Keeping hot data and cold data separate from each other is desirable for SSD storage because it reduces the number of programs and erases (e.g., program and erase operations stress the SSD storage and over time cause the electrical insulation of the SSD to break down, causing the SSD storage to become "leaky").

It is noted that the large buffer (220) may create a bottleneck. For example, since the data (of various sizes) is packed together in the buffer, there exists a dependency between each write (e.g., the write of data A (222), the write of data B (224), etc.). Each write must uniquely allocate a space and ensure that the subsequent allocation immediately follows (e.g., without any gaps). One way to provide this guarantee, is to us a mutex and/or lock so that only one allocation is performed at a time and each allocation knows exactly what all preceding allocations have done. However, in a system with many processors, we are reduced to single processor configuration. Furthermore, using a mutex and/or a lock incurs overhead and a solution which does not use a mutex and/or a lock would be preferable.

The embodiment shown addresses this with its multiple ring buffers. Since each ring buffer has its own write buffer (e.g., 740 and 706), the space (e.g., for a next piece of data being written) can be allocated with less of a bottleneck. Alternatively, we can create more write buffers (e.g., on the application) for each ring buffer; if space is needed from a ring buffer, through some lockless selection process, one of the write buffers assigned to the ring buffer is selected.

The following figure describes the multiple buffer example above more formally and/or generally in a flowchart.

Figure 8:
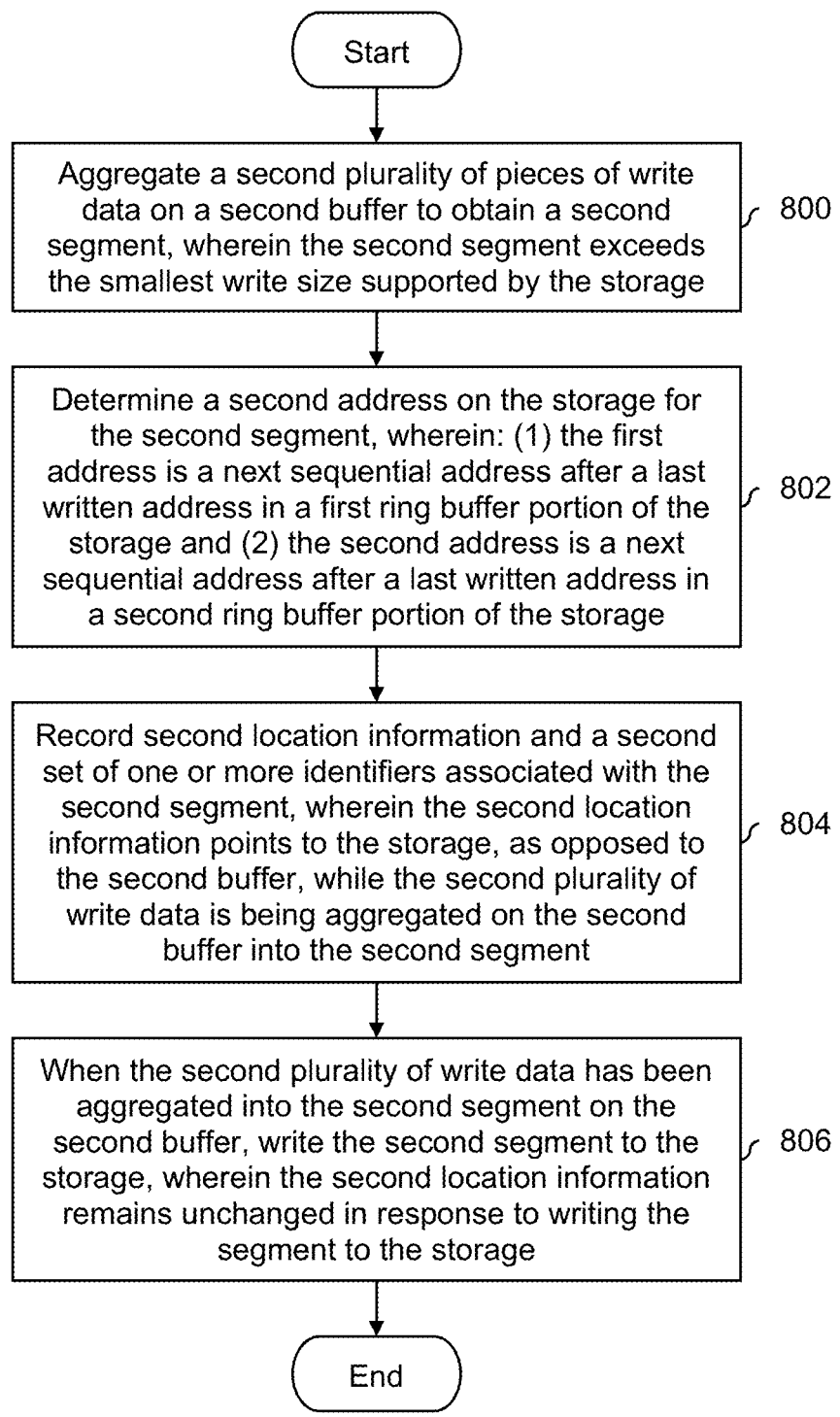
FIG. 8 is a flowchart illustrating an embodiment of a process to write a second segment to a second ring buffer portion of storage.

FIG. 8 is a flowchart illustrating an embodiment of a process to write a second segment to a second ring buffer portion of storage. In some embodiments, the process of FIG. 8 is performed in combination with the process of FIG. 1.

At 800, a second plurality of pieces of write data is aggregated on a buffer to obtain a second segment, wherein the second segment exceeds the smallest write size supported by the storage. For example, in FIG. 7, the first buffer (704) is used to assemble a (first) segment (e.g., at step 100 in FIG. 1) and the second buffer (706) is used to assemble a second segment (e.g., at step 800 in FIG. 8). In some embodiments, hot data is assigned to the first buffer (704) and cold data is assigned to the second buffer (706) in FIG. 7.

At 802, a second address is determined on the storage for the second segment, wherein: (1) the first address is a next sequential address after a last written address in a first ring buffer portion of the storage and (2) the second address is a next sequential address after a last written address in a second ring buffer portion of the storage. For example, in FIG. 7, the first ring buffer (712) is written sequentially with segments from the first buffer (704) and the second ring buffer (714) is written sequentially with segments from the second buffer (706).

At 804, second location information and a second set of one or more identifiers associated with the second segment are recorded, wherein the second location information points to the storage, as opposed to the second buffer, while the second plurality of write data is being aggregated on the second buffer into the second segment. In some embodiments, each buffer has its own buffer address and so the first buffer (704) in FIG. 7 has its own buffer address (not shown) to store corresponding location information and the second buffer (706) has a second buffer address (not shown) to store corresponding location information. Step 104 in FIG. 1 may include storing location information in the former buffer address and step 804 in FIG. 8 may include storing second location information in the latter buffer address. As described above, the location information and identifiers may also be recorded (e.g., on a long term basis) on a table.

At 806, when the second plurality of write data has been aggregated into the second segment on the second buffer, write the second segment to the storage, wherein the second location information remains unchanged in response to writing the segment to the storage. For example, in FIG. 7, when a (second) segment is assembled in the second buffer (706), it is written to the second ring buffer portion (714) in the storage (710).

Returning to FIG. 2, the location information (206a-206c) in the table is the same when the segment is still partially assembled in the buffer (220) as when the complete segment is stored in storage (210). This means a read process needs to have some way of knowing (e.g., beyond or outside of the table (200)) whether to fetch read data from the buffer or storage when there is a read instruction. The following figures describe various read process examples which ensure that the desired data is properly read from either the buffer or storage.

Returning to FIG. 2, in some embodiments a read process uses the information stored in the buffer address (230) and/or the table (200) to determine where to obtain a desired piece of data from (e.g., if data A is desired, if data B is desired, etc.). The following figure describes one such read process example.

Figure 9:
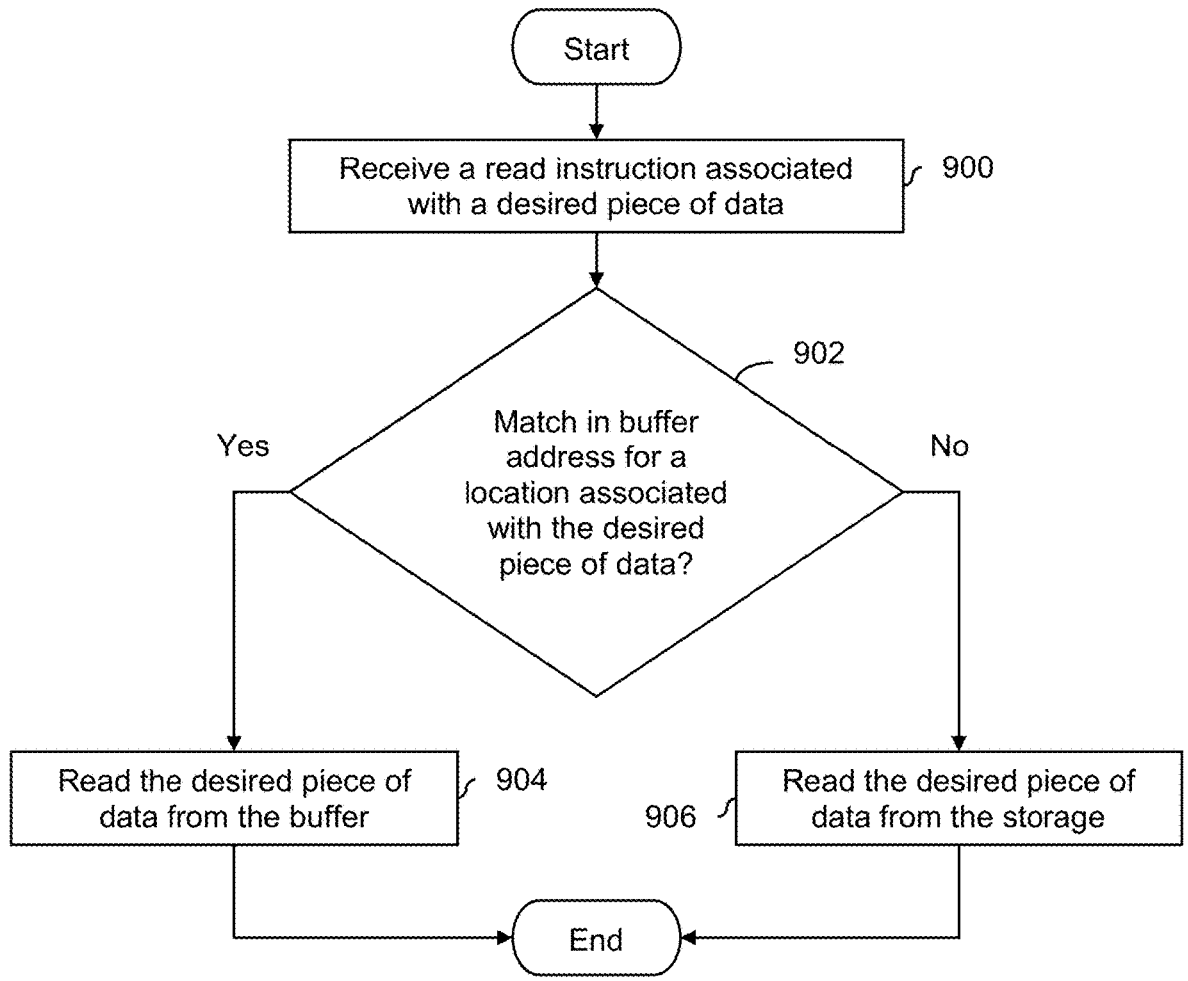
FIG. 9 is a flowchart illustrating an embodiment of a process to perform a read using a buffer address.

FIG. 9 is a flowchart illustrating an embodiment of a process to perform a read using a buffer address. In some embodiments, the process of FIG. 9 is performed in combination with the process of FIG. 1 (e.g., FIG. 1 is a write process and FIG. 9 is a corresponding read process). A variety of embodiments (e.g., single buffer, multiple buffers to multiple writing buffers, writing sequentially, writing non-sequentially, etc.) are described above and FIG. 9 is compatible with all of them.

At 900, a read instruction associated with a desired piece of data is received. For example, suppose data B (224) in FIG. 2 is desired and so the read instruction includes an identifier of B.

At 902, it is determined if there is a match in a buffer address for a location associated with the desired piece of data. To continue the example from above, the table (200) is first consulted and the identifier B is searched for. It is located at 204b and the corresponding address of i+3 (206b) is obtained. The buffer address (230) is then checked to see if it contains an address of i+3, which it does at 232b.

Note that although the buffer address (230) in FIG. 2 records location information for individual pieces of write data, the process of FIG. 2 still works with other embodiments. For example, in some embodiments they buffer address contains only single address corresponding to the segment as a whole. In that case, the process determines what segment the desired piece of data belongs to, a location corresponding to that segment (e.g., the start or beginning of the segment), and if the buffer address contains a location corresponding to the segment which includes the desired piece of data.

If there is a match at 902, the desired piece of data is read from the buffer at 904. In FIG. 2, for example, this involves determining the appropriate offset from the top of the buffer (220). In this example, this is done by subtracting the location of the start of the segment (in this example, i) from the address on storage associated with the desired piece of data (in this example, i+3). This produces an offset (from the top of the buffer) of (i+3)−i=3. Note data B (224) is located at 3 units from the top or beginning of buffer 220. If needed, the size of data B (224) may be calculated by determining the beginning of the next piece of data (i.e., where data C (226) begins in the buffer (220)), which corresponds to the end of the desired piece of data.

If there is no match at 904, then the desired piece of data is read from the storage at 906. To continue the example from above, in FIG. 2, the storage (210) would be read at (i+3), which is 3 units from the beginning or top of segment slot i (212). This is where data B would be located after being copied from the buffer (220) to the storage (210).

Although the above process may be sufficient for some applications, it may not work for all applications. For example, if there is a high write rate, all of the available buffers may be filled which would force a buffer to be reused. If a buffer is accidentally reused (e.g., by an aggregation process assembling a next segment in that buffer) while a read operation is trying to fetch some desired data from the buffer, the wrong data will be obtained. The following figures describes another, more secure read technique to avoid this.

Figure 10:
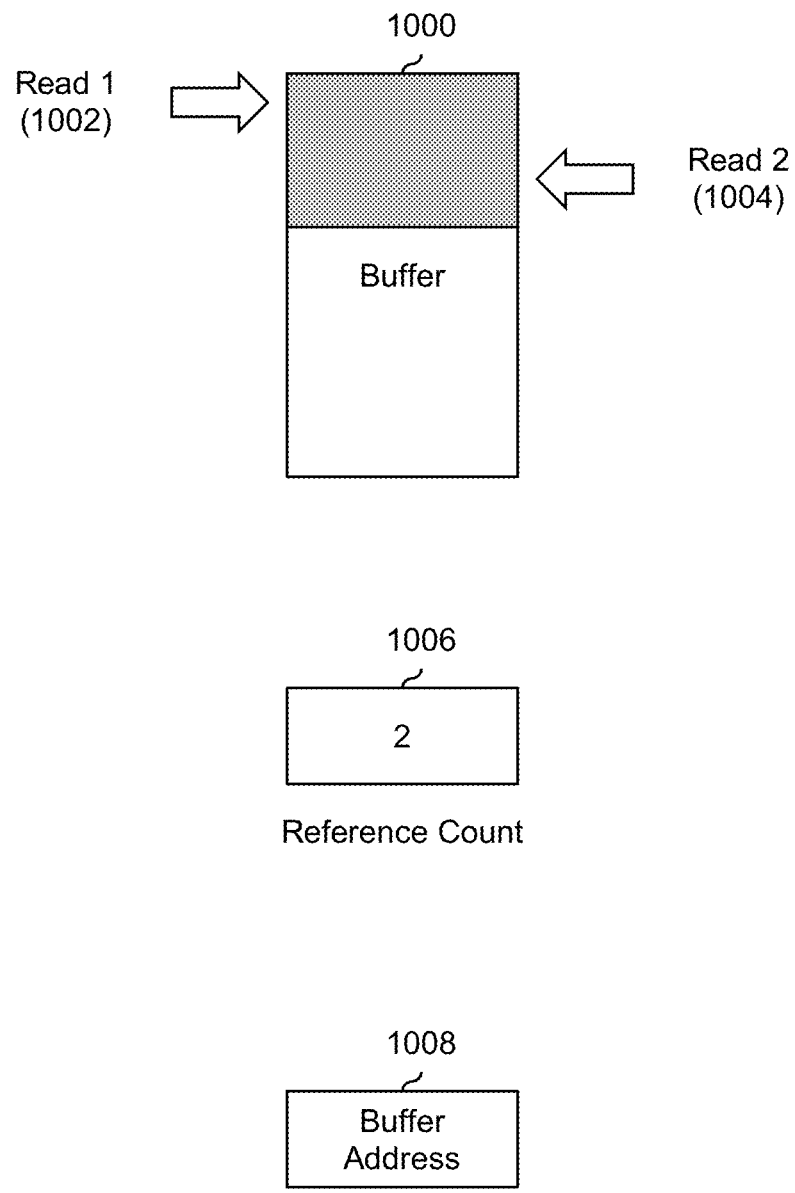
FIG. 10 is a diagram illustrating an embodiment of a reference count and buffer address associated with a buffer.

FIG. 10 is a diagram illustrating an embodiment of a reference count and buffer address associated with a buffer. In embodiments where there are multiple buffers (see, e.g., FIG. 7) there is a reference count and buffer address for each buffer. In the example shown, the buffer (1000) contains a partially complete segment. While in the partially completed state shown, two read requests are received for data in the partially completed segment. A first read (1002) is directed to a piece of data towards the beginning or top of the segment and a second read (1004) is directed to a piece of data further down in the segment.

The reference count (1006) is used to track the number of processes or entities that are currently accessing the buffer. Since there are two read operations accessing the buffer in the example shown here, the reference count here is set to 2 (e.g., where each read operation incremented the reference count when it checked the buffer address (1008), found a match, and decided to read from the buffer). When each read operation is complete, it decrements the reference count by 1 so that when both reads are done (and assuming no new reads come along) the reference count will return to 0. In some embodiments, only processes which are reading from the corresponding buffer increment the reference count.

An aggregation process (e.g., which uses the buffer to aggregate pieces of write data into a segment) is prohibited from reusing a buffer until the reference count is 0. In contrast, a copying process (e.g., which copies a complete segment from the buffer to the storage) is not so restricted by the reference count. A copying process is permitted to copy a complete segment from the buffer to the storage (e.g., even if/when the reference count is non-zero) so long as long as the original contents on the buffer remain unmodified after copying.

With the aggregation process restricted from reusing the buffer while the reference count is non-zero, read processes can use the following exemplary read process to ensure any data they read from the buffer is the correct data.

Figure 11:
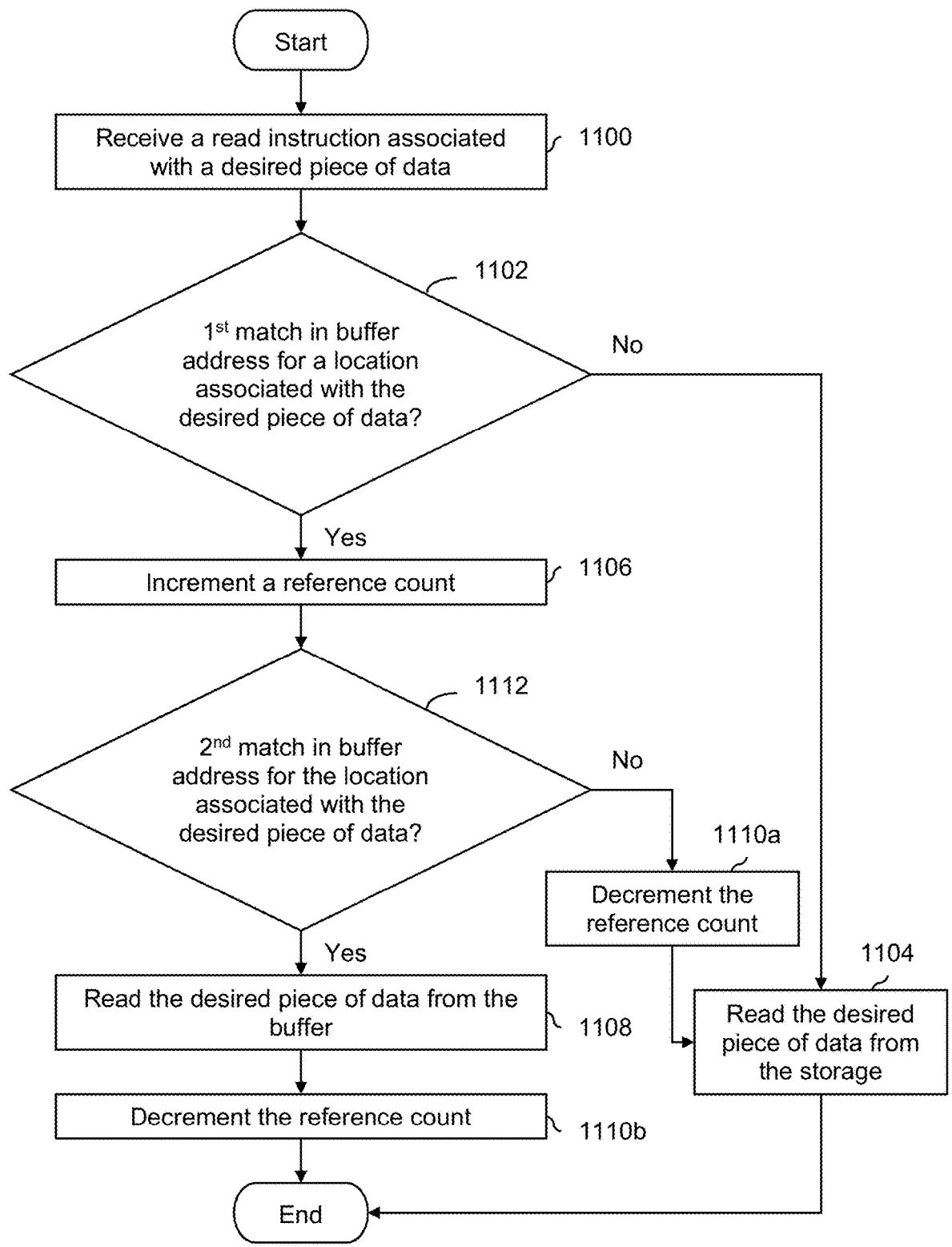
FIG. 11 is a flowchart illustrating an embodiment of a process to perform a read using a buffer address.

FIG. 11 is a flowchart illustrating an embodiment of a process to perform a read using a buffer address. As with FIG. 9, FIG. 11 is compatible with the various embodiments described above and in some embodiments the process of FIG. 11 is performed in combination with the process of FIG. 1.

At 1100, a read instruction associated with a desired piece of data is received. At 1102, it is determined if there is a first match in a buffer address for a location associated with the desired piece of data. As described above, the read instruction received at 1100 may include an identifier which is used to determine a location associated with the desired piece of data which in turn is used to see if there is a match at 1102.

If there is no match at 1102, then the desired piece of data is read from the storage at 1104. If there is a match at 1102, then a reference count is incremented at 1106. For example, in FIG. 2, each of the two read processes (1002 and 1004)

would have incremented the reference count (1006) before reading from the buffer (1000).

At 1112, it is determined (e.g., again) if there is a second match in the buffer address for the location associated with the desired piece of data. This is to ensure that there is no race condition to access the buffer. If there is (e.g., still) a match at 1112, then the desired piece of data is read from the buffer at 1108 (e.g., because it has been confirmed that there was no a race condition and the desired data can be safely read from the buffer). The reference count is then decremented at step 1110b.

If there is no match during the second check at 1112, then the reference count is decremented at step 1110a and the desired piece of data is read from the storage at 1104. That is, there was a race condition and so the data which was read from the buffer at step 1108 is discarded.

It is noted that reading in this manner permits reads to be performed safely and/or securely without a lock. Locks incur a fairly significant amount of overhead and so being able to perform reads without the use of locks is desirable.

A straightforward way of implementing an aggregation process (e.g., which writes to various pieces of (write) data to the buffer in order to aggregate them into a segment) would be to just wait for the reference count to be 0 before writing to the buffer. However, this may prevent the buffer from ever being reused of there are a lot of reads (i.e., there is a high read rate). The following figures describe an example of an aggregation process (or, more generally, a write process to a buffer) which ensures that the aggregation process will not be locked out of the buffer forever, even if there is a continuous stream of reads to the buffer.

Figure 12:
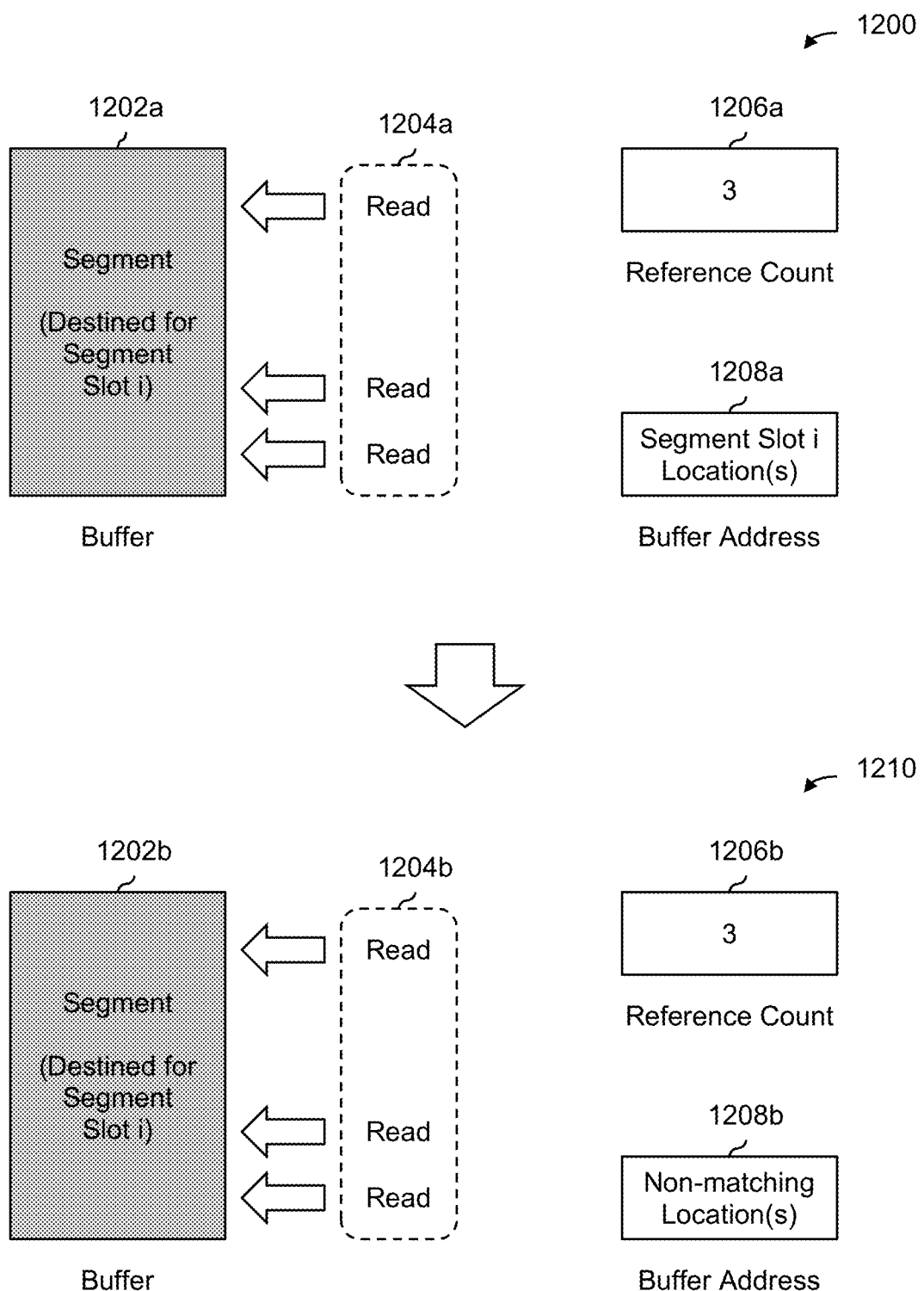
FIG. 12 is a diagram illustrating an embodiment of a buffer address which is changed by an aggregation process to contain non-matching locations.

FIG. 12 is a diagram illustrating an embodiment of a buffer address which is changed by an aggregation process to contain non-matching locations. In the example shown, diagram 1200 shows a first point in time. A buffer (1202a) contains a completed segment which is ready to be copied to storage. In the state shown, three read process (1204a) are reading from the buffer (1202a). As such, the reference count (1206a) has a value of 3. The segment in the buffer is destined for slot location i in the storage and so the buffer address (1208a) contains one or more locations associated with segment slot i.

An aggregation process wants to reuse the buffer and start writing new pieces of data to the buffer so that the next segment can be assembled. However, the aggregation process cannot overwrite the current segment in the buffer since there are currently read processes accessing the buffer (e.g., as indicated by the reference count).

To prevent new or future read processes from accessing the buffer, the aggregation process updates the buffer address to so that it non-matching locations. Diagram 1210 shows this. For example, instead of having one or more locations associated with segment slot i (which buffer address 1208a does contain and which would corresponding to the segment in buffer 1202a/1202b), some other location(s) are put into the buffer address (1208b). For example, some reserved address or location (e.g., which a read process would never access) may be written to buffer address 1208b). Any subsequent read process that is looking for the segment (destined for segment slot i) would check buffer address 1208b, not find a match, and would not try to access the buffer (1202b). Eventually, the read processes (1204a/1204b) which were accessing the buffer before the buffer address is updated will complete. This will cause the reference count to eventually go to 0, at which time the aggregation process may start writing new pieces of (write) data to the buffer in order to assemble the next segment. The buffer address would at that time be updated to reflect the new segment and/or new pieces of (write) data being written to the buffer.

To ensure that any future read processes which do not find a match in the updated buffer address (1208b) are able to find their desired data somewhere, the completed segment may be copied to storage (e.g., by a copying process) before the buffer address is updated (not shown here). Or, to put it another way, before the buffer address is updated with non-matching location(s), a check is performed to ensure that the segment has been copied to the storage and is available thereon. It is noted that a copy of the segment remains in the buffer even during or after copying to the storage (see, e.g., buffer 1202b which still includes the segment destined for segment slot i). Copying the segment to storage before the buffer address is changed ensures that no read process will be unable properly return or otherwise output its desired data (i.e., there are no read failures).

The following figure describes this more formally and/or generally in a flowchart.

Figure 13:
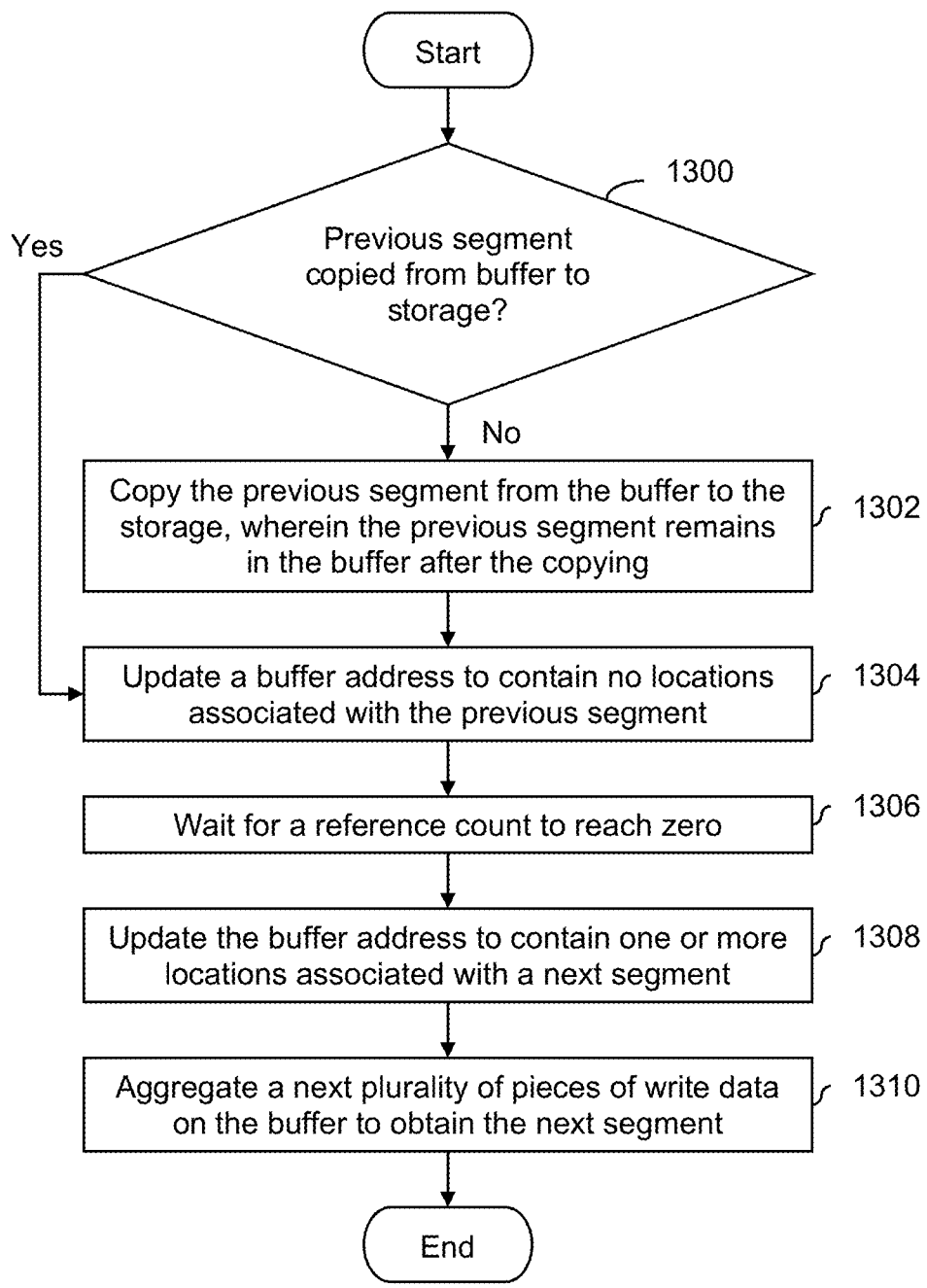
FIG. 13 is a flowchart illustrating an embodiment of a process to write to a buffer using a buffer address and a reference count.

FIG. 13 is a flowchart illustrating an embodiment of a process to write to a buffer using a buffer address and a reference count. In various embodiments, the process of FIG. 13 may be used at step 100 in FIG. 1, step 400 in FIG. 4, and/or step 800 in FIG. 8 to aggregate a plurality of pieces of write data on a buffer to obtain a segment.

At 1300, it is determined if a previous segment has been copied from the buffer to the storage. If not, the previous segment is copied from the buffer to the storage, wherein the previous segment remains in the buffer after the copying. See, for example, the completed segment in the buffer (1202a/1202b) in FIG. 12. Copying the previous segment from the buffer to the storage (if not already done so) ensures that any future read processes which are prevented from reading the buffer (e.g., once the buffer address is updated with location(s) which will not result in a match) will be able to obtain their desired data from the storage.

Once the previous segment is copied at step 1302 or if the previous segment was already determined to have been copied at step 1300, a buffer address is updated to contain no locations associated with the previous segment. See, for example, the change between buffer address 1208a in diagram 1200 in FIG. 12 versus the buffer address 1208b in diagram 1210. Before the change, the location(s) in buffer address 1208a match or otherwise corresponds to the segment in the buffer (1202a). After the change, the locations in buffer address 1208b do not match or otherwise correspond to the segment in the buffer (1202b). This prevents any future read processes from accessing the buffer.

At 1306, there is a wait for a reference count to reach zero. As described above, the reference count is used to track how many (read) processes are accessing the buffer. Once the count reaches 0, the buffer can be reused for and/or rewritten with the next segment. At 1308, the buffer address is updated to contain one or more locations associated with a next segment. At 1310, a next plurality of pieces of write data is aggregated on the buffer to obtain the next segment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor; and a memory coupled with the processor, wherein the memory is configured to provide the processor with instructions which when executed cause the processor to:
determine whether a time-to-live (TTL) associated with a piece of a plurality of pieces of write data satisfies a TTL threshold; and
in the event that the TTL associated with the piece of the plurality of pieces of write data fails to satisfy the TTL threshold, assign the piece of the plurality of pieces of write data to a second plurality of pieces of write data;
determine a size of one of a segment or a second segment, comprising to:
generate a plurality of performance curves relating to segment size and a performance metric, the performance metric relating to access time or access bandwidth, the plurality of performance curves including a first performance curve and a second performance curve, the first performance curve representing use of a single ring buffer, the second performance curve representing use of more than one ring buffer, wherein a performance curve is formed from an interpolation of a plurality of data points, the plurality of data points being obtained using a plurality of simulations with different segment sizes; and
identify, using the plurality of performance curves, the size of the one segment based on a desired level of performance and a number of ring buffers;
aggregate a first plurality of pieces of write data on a first buffer to obtain the segment, wherein the segment exceeds a smallest write size supported by the storage;
determine a first address on the storage for the segment;
record location information and a set of one or more identifiers associated with the segment, wherein the location information points to the storage, as opposed to the first buffer, while the first plurality of pieces of write data is being aggregated on the first buffer into the segment;
when the first plurality of pieces of write data has been aggregated into the segment on the first buffer, write the segment to the storage, wherein the location information remains unchanged in response to writing the segment to the storage;
aggregate the second plurality of pieces of write data on a second buffer to obtain the second segment, wherein the second segment exceeds the smallest write size supported by the storage;
determine a second address on the storage for the second segment, wherein: (A) (1) the first address is a next sequential address after a last written address in a first ring buffer portion of the storage and (2) the second address is a next sequential address after a last written address in a second ring buffer portion of the storage or (B) wherein the first address and the second address are non-sequential address;
record second location information and a second set of one or more identifiers associated with the second segment, wherein the second location information points to the storage, as opposed to the second buffer, while the second plurality of write data is being aggregated on the second buffer into the second segment; and
when the second plurality of write data has been aggregated into the second segment on the second buffer, write the second segment to the storage, wherein the second location information remains unchanged in response to writing the segment to the storage.

2. The system recited in claim 1, wherein the memory is further configured to provide the processor with instructions which when executed cause the processor to:
receive a read instruction associated with a desired piece of data;
determine if there is a match in a buffer address for a location associated with the desired piece of data;
in the event it is determined that there is a match, read the desired piece of data from the first buffer; and
in the event it is determined that there is no match, read the desired piece of data from the storage.

3. The system recited in claim 1, wherein the memory is further configured to provide the processor with instructions which when executed cause the processor to:
receive a read instruction associated with a desired piece of data;
determine if there is a first match in a buffer address for a location associated with the desired piece of data;
in the event it is determined that there is no first match, read the desired piece of data from the storage; and
in the event it is determined that there is a first match:
increment a reference count;
determine if there is a second match in the buffer address for the location associated with the desired piece of data;
in the event it is determined that there is no second match:
decrement the reference count; and
read the desired piece of data from the storage; and
in the event it is determined that there is a second match:
read the desired piece of data from the first buffer; and
decrement the reference count.

4. The system recited in claim 1, wherein the instructions for aggregating include instructions for:
determining if a previous segment has been copied from the first buffer to the storage;
in the event it is determined that the previous segment has not been copied, copying the previous segment from the first buffer to the storage, wherein the previous segment remains in the first buffer after the copying;
updating a buffer address to contain no locations associated with the previous segment;
waiting for a reference count to reach zero;
updating the buffer address to contain one or more locations associated with a next segment; and
aggregating a next plurality of pieces of write data on the first buffer to obtain the next segment.

5. A method, comprising:
determining whether a time-to-live (TTL) associated with a piece of a plurality of pieces of write data satisfies a TTL threshold; and
in the event that the TTL associated with the piece of the plurality of pieces of write data fails to satisfy the TTL threshold, assigning the piece of the plurality of pieces of write data to a second plurality of pieces of write data;
determining a size of one of a segment or a second segment, comprising to:
generating a plurality of performance curves relating to segment size and a performance metric, the performance metric relating to access time or access bandwidth, the plurality of performance curves including a first performance curve and a second performance curve, the first performance curve representing use of a single ring buffer, the second performance curve representing use of more than one ring buffer, wherein a performance curve is formed from an interpolation of a plurality of data points, the plurality of data points being obtained using a plurality of simulations with different segment sizes; and identifying, using the plurality of performance curves, the size of the one segment based on a desired level of performance and a number of ring buffers;

aggregating a first plurality of pieces of write data on a first buffer to obtain the segment, wherein the segment exceeds a smallest write size supported by the storage;

determining a first address on the storage for the segment;

recording location information and a set of one or more identifiers associated with the segment, wherein the location information points to the storage, as opposed to the first buffer, while the first plurality of pieces of write data is being aggregated on the first buffer into the segment;

when the first plurality of pieces of write data has been aggregated into the segment on the first buffer, writing the segment to the storage, wherein the location information remains unchanged in response to writing the segment to the storage;

aggregating a second plurality of pieces of write data on a second buffer to obtain the second segment, wherein the second segment exceeds the smallest write size supported by the storage;

determining a second address on the storage for the second segment, wherein: (A)(1) the first address is a next sequential address after a last written address in a first ring buffer portion of the storage and (2) the second address is a next sequential address after a last written address in a second ring buffer portion of the storage or (B) the first address and the second address are non-sequential address;

recording second location information and a second set of one or more identifiers associated with the second segment, wherein the second location information points to the storage, as opposed to the second buffer, while the second plurality of write data is being aggregated on the second buffer into the second segment; and when the second plurality of write data has been aggregated into the second segment on the second buffer, writing the second segment to the storage, wherein the second location information remains unchanged in response to writing the segment to the storage.

6. The method recited in claim 5 further including:
receiving a read instruction associated with a desired piece of data;
determining if there is a match in a buffer address for a location associated with the desired piece of data;
in the event it is determined that there is a match, reading the desired piece of data from the first buffer; and
in the event it is determined that there is no match, reading the desired piece of data from the storage.

7. The method recited in claim 5 further including:
receiving a read instruction associated with a desired piece of data;
determining if there is a first match in a buffer address for a location associated with the desired piece of data;
in the event it is determined that there is no first match, reading the desired piece of data from the storage; and
in the event it is determined that there is a first match:
incrementing a reference count;
determining if there is a second match in the buffer address for the location associated with the desired piece of data;
in the event it is determined that there is no second match:
decrementing the reference count; and
reading the desired piece of data from the storage; and
in the event it is determined that there is a second match:
reading the desired piece of data from the first buffer; and
decrementing the reference count.

8. The method recited in claim 5, wherein aggregating includes:
determining if a previous segment has been copied from the first buffer to the storage;
in the event it is determined that the previous segment has not been copied, copying the previous segment from the first buffer to the storage, wherein the previous segment remains in the first buffer after the copying;
updating a buffer address to contain no locations associated with the previous segment;
waiting for a reference count to reach zero;
updating the buffer address to contain one or more locations associated with a next segment; and
aggregating a next plurality of pieces of write data on the first buffer to obtain the next segment.

9. The method recited in claim 5, wherein:
aggregating the second plurality of write data includes:
determining if a previous segment has been copied from the first buffer to the storage;
in the event it is determined that the previous segment has not been copied, copying the previous segment from the first buffer to the storage, wherein the previous segment remains in the first buffer after the copying;
updating a buffer address to contain no locations associated with the previous segment;
waiting for a reference count to reach zero;
updating the buffer address to contain one or more locations associated with a next segment; and
aggregating a next plurality of pieces of write data on the first buffer to obtain the next segment.

10. The method recited in claim 5, wherein:
aggregating the second plurality of write data includes:
determining if a previous segment has been copied from the first buffer to the storage;
in the event it is determined that the previous segment has not been copied, copying the previous segment from the first buffer to the storage, wherein the previous segment remains in the first buffer after the copying;
updating a buffer address to contain no locations associated with the previous segment;
waiting for a reference count to reach zero;
updating the buffer address to contain one or more locations associated with a next segment; and
aggregate a next plurality of pieces of write data on the first buffer to obtain the next segment.

11. A computer program product, the computer program product being embodied in a non-transitory computer readable storage medium and comprising computer instructions for:

determining whether a time-to-live (TTL) associated with a piece of a plurality of pieces of write data satisfies a TTL threshold; and in the event that the TTL associated with the piece of the plurality of pieces of write data fails to satisfy the TTL threshold, assigning the piece of the plurality of pieces of write data to a second plurality of pieces of write data;

determining a size of one of a segment or a second segment, comprising to:

generating a plurality of performance curves relating to segment size and a performance metric, the performance metric relating to access time or access bandwidth, the plurality of performance curves including a first performance curve and a second performance curve, the first performance curve representing use of a single ring buffer, the second performance curve representing use of more than one ring buffer, wherein a performance curve is formed from an interpolation of a plurality of data points, the plurality of data points being obtained using a plurality of simulations with different segment sizes; and identifying, using the plurality of performance curves, the size of the one segment based on a desired level of performance and a number of ring buffers;

aggregating a first plurality of pieces of write data on a first buffer to obtain the segment, wherein the segment exceeds a smallest write size supported by the storage;

determining a first address on the storage for the segment;

recording location information and a set of one or more identifiers associated with the segment, wherein the location information points to the storage, as opposed to the first buffer, while the first plurality of pieces of write data is being aggregated on the first buffer into the segment;

when the first plurality of pieces of write data has been aggregated into the segment on the first buffer, writing the segment to the storage, wherein the location information remains unchanged in response to writing the segment to the storage;

aggregating a second plurality of pieces of write data on a second buffer to obtain the second segment, wherein the second segment exceeds the smallest write size supported by the storage;

determining a second address on the storage for the second segment, wherein: (A)(1) the first address is a next sequential address after a last written address in a first ring buffer portion of the storage and (2) the second address is a next sequential address after a last written address in a second ring buffer portion of the storage or (B) the first address and the second address are non-sequential address;

recording second location information and a second set of one or more identifiers associated with the second segment, wherein the second location information points to the storage, as opposed to the second buffer, while the second plurality of write data is being aggregated on the second buffer into the second segment; and when the second plurality of write data has been aggregated into the second segment on the second buffer, writing the second segment to the storage, wherein the second location information remains unchanged in response to writing the segment to the storage.

* * * * *